(12) United States Patent
Bohr et al.

(10) Patent No.: US 8,262,293 B2
(45) Date of Patent: Sep. 11, 2012

(54) RADIAL ROLLING BEARING

(75) Inventors: Andreas Bohr, Herzogenaurach (DE); Horst Doeppling, Herzogenaurach (DE); Heinrich Hofmann, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 116 days.

(21) Appl. No.: 12/681,144

(22) PCT Filed: Sep. 2, 2008

(86) PCT No.: PCT/EP2008/061534
§ 371 (c)(1),
(2), (4) Date: Aug. 9, 2010

(87) PCT Pub. No.: WO2009/043664
PCT Pub. Date: Apr. 9, 2009

(65) Prior Publication Data
US 2010/0296761 A1 Nov. 25, 2010

(30) Foreign Application Priority Data
Oct. 4, 2007 (DE) .......... 10 2007 047 527

(51) Int. Cl.
*F16C 33/34* (2006.01)
*F16C 33/48* (2006.01)

(52) U.S. Cl. ......... 384/568; 384/565; 384/548; 384/572

(58) Field of Classification Search ............ 384/513, 384/551, 564, 568, 572, 582, 613, 614, 537, 384/548, 565, 584; 29/898.068
See application file for complete search history.

(56) References Cited

U.S. PATENT DOCUMENTS

| | | | | | |
|---|---|---|---|---|---|
| 1,671,372 | A | * | 5/1928 | Leedham | 384/513 |
| 1,766,440 | A | * | 6/1930 | Leon | 384/558 |
| 2,586,406 | A | * | 2/1952 | Wallgren | 384/568 |
| 2,705,176 | A | * | 3/1955 | Palmgren | 384/580 |
| 2,740,675 | A | * | 4/1956 | Palmgren | 384/564 |
| 3,262,186 | A | * | 7/1966 | Anderson et al. | 29/898.068 |
| 3,547,504 | A | * | 12/1970 | Cedler Lech et al. | 384/558 |
| 3,667,821 | A | * | 6/1972 | Rader | 384/574 |
| 3,912,346 | A | * | 10/1975 | Boratynski et al. | 384/568 |
| 4,345,800 | A | * | 8/1982 | Hofmann et al. | 384/450 |
| 5,009,524 | A | * | 4/1991 | Dittenhoefer | 384/558 |

(Continued)

FOREIGN PATENT DOCUMENTS

DE         43 34 195 A      3/1994

(Continued)

*Primary Examiner* — Marcus Charles
(74) *Attorney, Agent, or Firm* — Lucas & Mercanti, LLP; Klaus P. Stoffel

(57) ABSTRACT

A double-row angular contact bearing and which has outer and inner bearing rings with two rows of rolling elements disposed between the bearing rings that are held by two bearing cages interspaced at even distances. At least one row is configured as balls with parallel lateral faces that are symmetrically flattened. Both rows of rolling elements roll in adjacent races machined into the inner face of the outer ring and the outer face of the inner ring. The contact angle axes are pitched towards each other in an O-arrangement or X-arrangement and the races are axially delimited only on one side by shoulders. Additional clearance and supporting contours are formed at axial edge sections, opposite the shoulders, onto the races. The contours can be used to fit the balls into angular contact by axially inserting them into the clearance between the bearing rings and then tilting them into the races.

6 Claims, 3 Drawing Sheets

U.S. PATENT DOCUMENTS

| | | | | |
|---|---|---|---|---|
| 5,145,267 A | * | 9/1992 | Takata et al. | 384/569 |
| 6,814,494 B2 | * | 11/2004 | Borowski et al. | 384/568 |
| 2002/0085773 A1 | * | 7/2002 | Shoda et al. | 384/47 |
| 2005/0117827 A1 | * | 6/2005 | Fujii et al. | 384/510 |
| 2008/0166082 A1 | * | 7/2008 | Hofmann et al. | 384/613 |

FOREIGN PATENT DOCUMENTS

| | | |
|---|---|---|
| DE | 10 2005 061 792 A | 7/2007 |
| GB | 141 694 X | 7/1921 |

* cited by examiner

RADIAL ROLLING BEARING

This application is a 371 of PCT/EP2008/061534 filed Sep. 2, 2008, which in turn claims the priority of DE 10 2007 047 527.8 filed Oct. 4, 2007, the priority of both applications is hereby claimed and both applications are incorporated by reference herein.

FIELD OF THE INVENTION

The invention relates to a radial rolling bearing, and can be applied particularly advantageously to double-row angular contact rolling bearings whose rolling bodies are embodied as ball rollers with, in each case, two side faces which are flattened symmetrically from a basic ball shape and are arranged parallel to one another.

BACKGROUND OF THE INVENTION

Double-row angular contact rolling bearings are applied wherever not only large radial forces but also large axial forces have to be taken up from both directions due to the bearing position. The most common embodiment of such angular contact rolling bearings in this context is the double-row angular contact rolling bearing in which both rows of bearing balls are arranged on contact angle axes which are positioned in an O-arrangement or X-arrangement with respect to one another. In order to bring about a high level of filling with bearing balls and therefore the highest possible load-bearing capability of such angular contact rolling bearings, the bearing balls either have a filling groove on one side on the outer bearing ring or an inner bearing ring which is embodied split into two axially. Another possible way of bringing about a high filling level with rolling bodies and therefore a high load-bearing capability of a double-row angular contact rolling bearing but without a filling groove on the outer bearing ring and without an inner bearing ring which is embodied split into two axially has been disclosed by DE 43 34 195 A1. In this document, a double-row angular contact rolling bearing of the generic type is disclosed in FIG. 2e, which double-row angular contact rolling bearing is composed essentially of an outer bearing ring and an inner bearing ring and also of a multiplicity of rolling bodies which are arranged one next to the other in two rows between the bearing rings, but the rolling bodies are not embodied as bearing balls but as ball rollers with, in each case, two side faces which are flattened symmetrically from a basic ball shape and are arranged parallel to one another. The two rows of the ball rollers, which are held at uniform distances from one another in the circumferential direction by means of two bearing cages, roll here in, in each case, two adjacent groove-shaped raceways which are formed in the inner side of the outer bearing ring and in the outer side of the inner bearing ring and whose contact angle axes are positioned in an O-arrangement with respect to one another and which are delimited axially on one side by one shoulder in each case. This angular contact rolling bearing is to be filled here by axial insertion of the ball rollers, which are oriented horizontally with their side faces, into the clearance between the bearing rings, and subsequent tilting of the ball rollers into the raceways of the angular contact rolling bearing. After the uniform distribution of the ball rollers in their raceways in the circumferential direction, the two bearing cages, which are embodied, for example, as plastic snap-action cages according to the central embodiment in FIG. 3 of the specified document, are then snapped from both axial sides of the bearing onto the ball rollers in order to fix the latter in their operating position in the angular contact rolling bearing.

However, in practice it has been found that with a double-row angular contact rolling bearing which is embodied in such a way it is not possible to mount the ball rollers in the described manner, or it is only possible to do so with very high expenditure. When attempting to perform such mounting of the ball rollers it has, in fact, become apparent that after the ball rollers have been inserted axially into the clearance between the bearing rings until they abut against their raceway in the outer bearing ring, it is not possible to tilt the ball rollers in the direction of the raceways in the inner bearing ring or it is only possible to do so with large application of force, since the latter become misaligned with their side faces pointing to the outer bearing ring on the inner side of the outer bearing ring. Even if it is then possible to tilt the ball rollers in the direction of the raceways in the inner bearing ring while using tolerances or the elasticity of all the parts, the limits of the specified mounting possibility are run up against once more since the ball rollers frequently slip through between the bearing rings in the direction of the raceway lying opposite in the inner bearing ring, or the ball rollers become misaligned again on the raceway provided for them in the inner bearing ring. Furthermore, it has proven a disadvantage of the described bearing cage for the double-row angular contact rolling bearing that the pocket webs which are embodied with the snap-action projections are of relatively broad design and therefore do not constitute an optimum for the largest possible degree of filling of the angular contact rolling bearing. It is also disadvantageous that the possibility of movement of the ball rollers in the pockets of the snap-action cage cannot be adapted to operationally conditioned fluctuations in the contact angle axes, with the result that when such fluctuations in the contact angle occur it is very probable that the ball rollers will snap out of their cage pockets and as a result serious damage will occur to the bearing.

OBJECT OF THE INVENTION

Starting from the disadvantages in the known prior art which are presented above, the invention is therefore based on the object of designing a radial rolling bearing, in particular a double-row angular contact rolling bearing which can be easily filled with rolling bodies, embodied as ball rollers, during the axial mounting procedure, and the bearing cage of which angular contact rolling bearing is embodied in such a way that the largest possible degree of filling of the angular contact rolling bearing is ensured and it is possible to adapt the ball rollers to operationally conditioned fluctuations in the contact angle axes.

DESCRIPTION OF THE INVENTION

According to the invention, this object is achieved in a double-row angular contact rolling bearing having at least one row of ball rollers, in that, on the one hand, additional free space contours and supporting contours are integrally formed at least on the raceways, arranged in the outer bearing ring and in the inner bearing ring of the row of rolling bodies which are embodied as ball rollers, in each case in the region of the axial edge parts lying opposite the shoulders of the raceways, by means of which free space contours and supporting contours the ball rollers can be fitted into the angular contact rolling bearing through axial insertion into the clearance between the bearing rings and subsequent tilting into the raceways.

Preferred embodiments and developments of the radial roiling bearing embodied according to the invention are described below.

Accordingly, there is provision in the radial rolling bearing according to the invention that it is preferably embodied as a double-row angular contact rolling bearing with contact angle axes which are positioned in an O arrangement with respect to one another, in which radial rolling bearing both rows of the rolling bodies are embodied as ball rollers and all the raceways in the bearing rings are embodied with additional free space contours and supporting contours in the region of the edge parts lying opposite the shoulders of the raceways. As a result, a symmetrical embodiment of the bearing rings is advantageously obtained, which embodiment has a favorable effect on the fabrication costs of the bearing rings. However, it is also possible to fill the angular contact rolling bearing with a row of ball rollers and a row of bearing balls which are then firstly mounted in the inner bearing ring without an outer bearing ring, in order subsequently to fit the outer bearing ring onto the bearing balls and finally insert the ball rollers into the bearing in the described way.

A further feature of the radial rolling bearing embodied according to the invention is that annular grooves which, in the outer bearing ring, in each case open into raceways thereof, and are wedge-shaped in cross-section, are arranged as additional free space contours which are provided in order to bring about the necessary freedom of movement in order to tilt the ball rollers into their operating position in the raceways of the two bearing rings. These wedge-shaped annular grooves are each formed with their wedge face which opens into the raceways in the outer bearing ring extending obliquely with respect to the axial sides of the radial rolling bearing, in the inner side of the outer bearing ring, and each have, together with the adjoining raceway, a somewhat greater length than the diameter of the ball rollers and a depth which is dependent on the contact angle of the bearing and is proportionally larger as the contact angle increases. The annular grooves which are embodied in such a way therefore provide the necessary free space in order to avoid the misalignment, described in the prior art, of the ball rollers with their side faces on the inner side of the outer bearing ring when the tilting into their raceways is initiated.

The rolling bearing which is embodied according to the invention is also distinguished by the fact that, arranged as an additional supporting contour in the inner bearing ring is a central rim, which is wedge-shaped in cross-section, opens in each case with its wedge faces into the raceways of the bearing ring and is provided for carrying out pivoting guidance during the tilting of the ball rollers into their operating position in the raceways of the two bearing rings. This wedge-shaped central rim is here approximately of the same height as the shoulders on the raceways of the inner bearing ring and has, between its wedge faces, an angle which is dependent on the distance between the raceways in the inner bearing ring. With the aid of a central rim which is embodied in such a way it is therefore possible to prevent the ball rollers from slipping through between the bearing rings in the direction of the raceway lying respectively opposite in the inner bearing ring, as described in the prior art, and to avoid the renewed misalignment of the ball rollers on the raceway provided for them in the inner bearing ring, as well as to support the ball rollers during the tilting into their raceways on their pivoting path until they have reached their final operating position in the raceways.

Further features of the radial rolling bearing embodied according to the invention which also contribute to the solution of the stated problem are described below.

In a further aspect of the present invention, the bearing cages for both rows of rolling bodies are each preferably embodied as collar snap-action cages from a plastic, in which bearing cages a plurality of collars which, between them, form cage pockets which are adapted to the contour of the rolling bodies are integrally formed axially on one side of in each case one circumferential cage ring. Since the cage pockets are adapted here at the same time to the contact angle of the respective row of ball rollers, that is to say are formed obliquely in the inner side of the cage ring, the collars of the bearing cage therefore have a triangular profile cross-section in which the triangular tip, which points to the inner bearing ring, is arranged approximately at the level of the pitch circle of the ball rollers. During the mounting of the bearing cage, this triangular tip of the collars then snaps slightly over the diameter half of the ball rollers, with the result that the ball rollers are separated from one another at the pitch circle only by this very narrow part of the collars, and as a result, in contrast to the pocket webs in the solution mentioned in the prior art, ensure the largest possible degree of filling of the angular contact rolling bearing.

Furthermore, there is provision that snap-action projections, which each project obliquely with respect to the inner side of the outer bearing ring, are integrally formed on the upper side of the collars, pointing to the outer bearing ring, of both bearing cages, which snap-action projections can each be latched into the wedge-shaped annular grooves in the outer bearing ring in order to fix the bearing cages in position in the angular contact rolling bearing. For reasons of stability, the snap-action projections preferably take up the full width of the upper sides of the collars here and are adapted in their oblique arrangement and in their length to the angle and to the length of the wedge face of the annular groove which is arranged in the outer bearing ring. The particular advantage of such fixing of the bearing cages in position is that the annular grooves, which are originally provided for facilitating the mounting of the ball rollers in the outer bearing ring, can therefore be used for a further function.

Finally, it is additionally proposed that the base of all the cage pockets in the bearing cages are additionally embodied in a slight roof-shape in order to automatically adapt the rolling bodies, formed as ball rollers, to operationally conditioned fluctuations in the contact angle axes in the circumferential direction. "In a slight roof-shape" is to be understood here as meaning that the base of the cage pockets which is embodied in an oblique fashion and is already adapted to the contact angle of the radial rolling bearing additionally has, in the circumferential direction, a uniform, wedge-shaped elevation in the form of a roof whose slope is approximately 5° to 10° on both sides. As a result it is possible for the ball rollers to adapt themselves automatically in their pockets to contact angle fluctuations between 10° and 20° without the ball rollers snapping out of their cage pockets in the process.

To summarize, the radial rolling bearing embodied according to the invention therefore has the advantage over the radial rolling bearings known from the prior art that, as a result of the embodiment with additional free space contours and supporting contours on the raceways of the rolling bodies in the inner bearing ring and in the outer bearing ring, the radial rolling bearing can easily be filled, in the axial mounting procedure, with rolling bodies which are embodied as ball rollers. At the same time, the embodiment of the bearing cages in the two rows of ball rollers as collar snap-action cages with collars which are made extremely narrow at the pitch circle and with all the cage pockets having a base which is embodied in the form of a roof ensures that the highest possible degree of filling of the angular contact rolling bearing occurs and the ball rollers can be adapted to operationally conditioned fluctuations in the contact angle axes.

BRIEF DESCRIPTION OF THE DRAWINGS

A preferred embodiment of the radial rolling bearing embodied according to the invention will be explained in more detail below with reference to the appended drawings, in which.

DETAILED DESCRIPTION OF THE DRAWINGS

Figure 1:
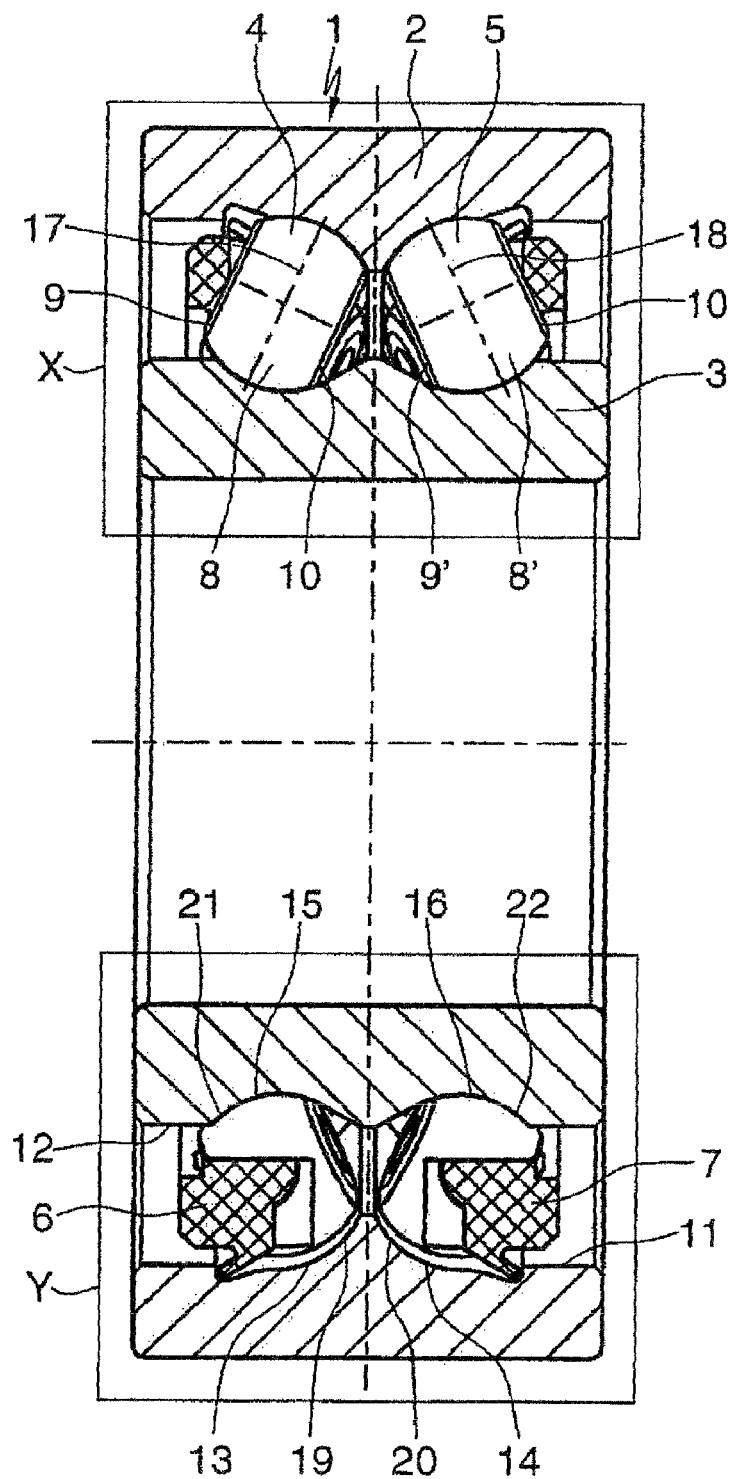
FIG. 1 shows a cross-section through a radial rolling bearing according to the invention which is embodied as a double-row angular contact rolling bearing in an O-arrangement.

FIG. 1 clearly shows a radial rolling bearing which is embodied as a double-row angular contact rolling bearing 1 which is composed essentially of an outer bearing ring 2 and an inner bearing ring 3 and also of a multiplicity of rolling bodies 8, 8' which are arranged one next to the other in two rows 4, 5 between the bearing rings 2, 3 and are embodied in both rows 4, 5 as ball rollers with, in each case, two side faces 9, 9', 10, 10' which are flattened symmetrically from a basic ball shape and are arranged parallel to one another. The two rows 4, 5 of the rolling bodies 8, 8' which are held at uniform distances from one another in the circumferential direction by means of two bearing cages 6, 7 roll here in, in each case, two adjacent groove-shaped raceways 13, 14 and 15, 16 which are formed in the inner side 11 of the outer bearing ring 2 and in the outer side 12 of the inner bearing ring 3, and the contact angle axes 17, 18 of which raceways 13, 14 and 15, 16 are positioned in an O-arrangement with respect to one another and are bounded axially on one side by one shoulder 19, 20, 21, 22 in each case.

Figure 2:
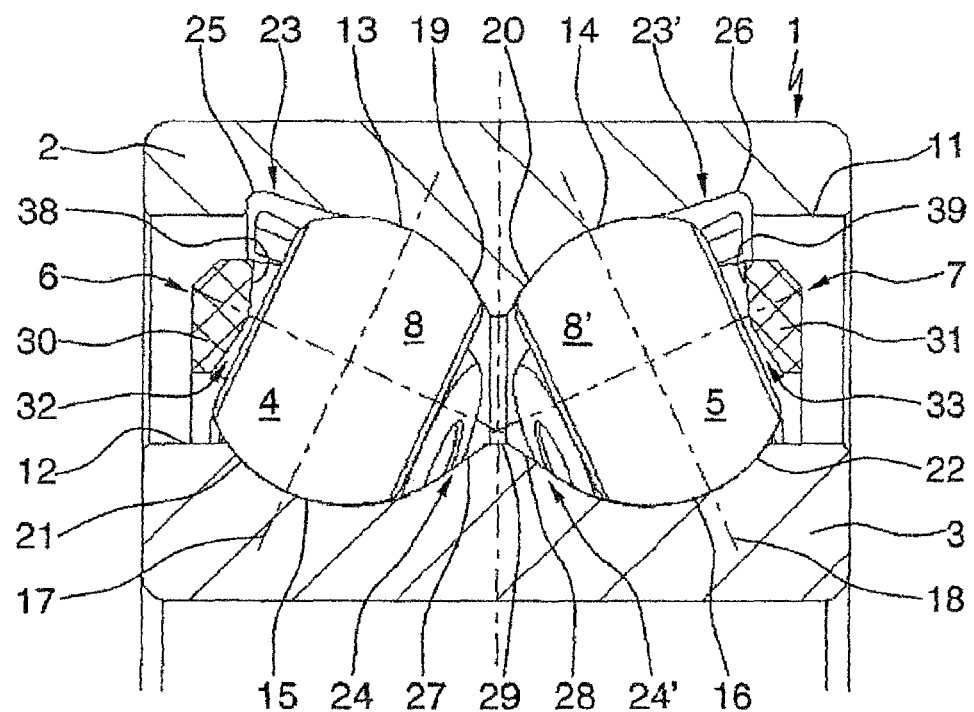
FIG. 2 shows an enlarged illustration of the detail X of the radial rolling bearing according to FIG. 1 which is embodied according to the invention.
Figure 3:
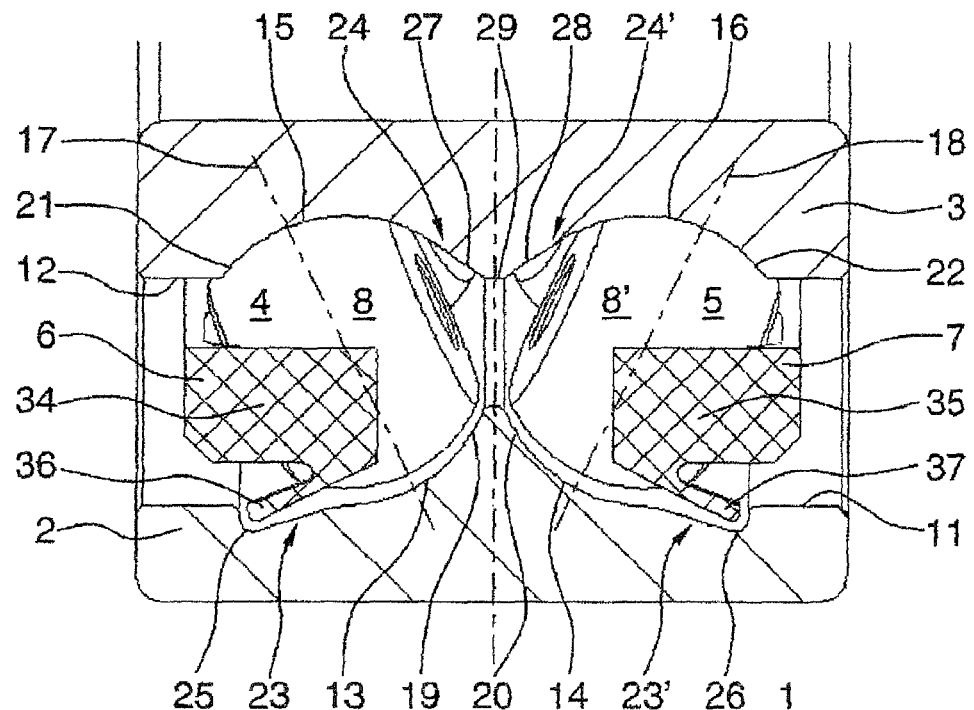
FIG. 3 shows an enlarged illustration of the detail Y of the radial rolling bearing according to FIG. 1 which is embodied according to the invention.

The enlarged illustrations in FIGS. 2 and 3 also show that additional free space contours and supporting contours 23, 23', 24, 24' are integrally formed on the raceways 13, 14, 15, 16 arranged in the outer bearing ring 2 and in the inner bearing ring 3 of the rolling bodies 8, 8' which are embodied as ball rollers, according to the invention, in each case in the region of the axial edge parts lying opposite the shoulders 19, 20, 21, 22 of the raceways 13, 14, 15, 16 by means of which free space contours and supporting contours 23, 23', 24, 24' the ball rollers can be filled into the angular contact rolling bearing 1 through axial insertion into the clearance between the bearing rings 2, 3 and subsequent tilting into the raceways 13, 14, 15, 16. Two annular grooves 25, 26, which are clearly visibly arranged in the outer bearing ring 2, and open into the raceways 13, 14 thereof, are wedge-shaped in cross-section and arranged here as additional free space contours 23, 23' which are provided in order to bring about the necessary freedom of movement in order to tilt the ball rollers into their operating position in the raceways 13, 14 and 15, 16 of the two bearing rings 2, 3. The additional supporting contours 24, 24' are formed here by a central rim 29 which is wedge-shaped in cross-section and opens with its wedge faces 27, 28 into the raceways 15, 16 in the inner bearing ring 3 and is provided for carrying out pivoting guidance during the tilting of the ball rollers into their operating position in the raceways 13, 14, and 15, 16.

Figure 4:
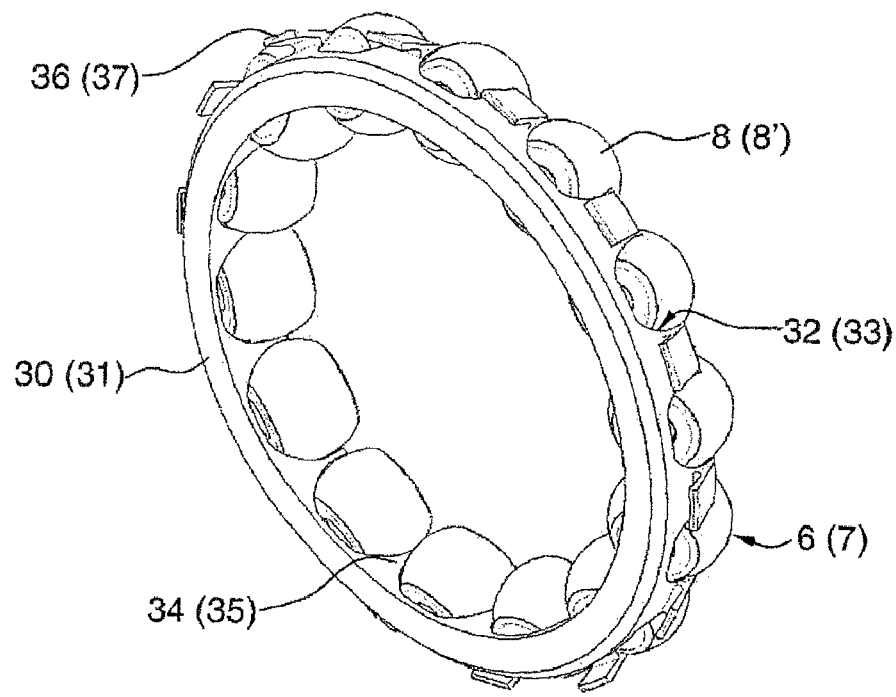
FIG. 4 shows an enlarged, spatial illustration of the rear side of a bearing cage, equipped with ball rollers, of the radial rolling bearing which is embodied according to the invention.
Figure 5:
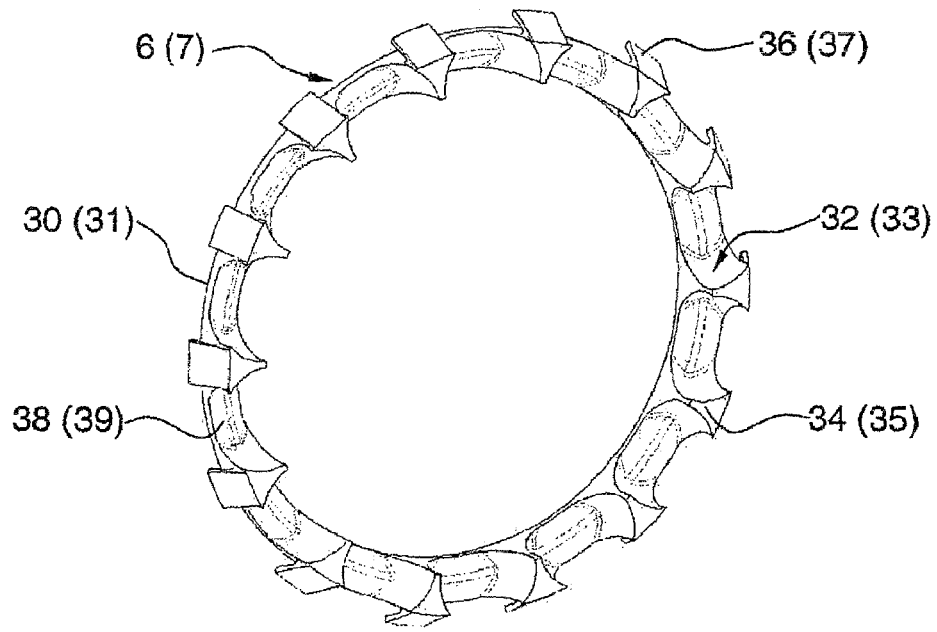
FIG. 5 shows an enlarged spatial illustration of the front side of a bearing cage of the radial rolling bearing embodied according to the invention, without ball rollers.

Finally, FIGS. 4 and 5 illustrate that the bearing cages 6, 7 for both rows 4, 5 of rolling bodies 8, 8' are each embodied as collar snap-action cages from a plastic, in which bearing cages 6, 7 a plurality of collars 34, 35 which, between them, form cage pockets 32, 33 which are adapted to the contour of the rolling bodies 8, 8' are integrally formed axially on one side of in each case one circumferential cage ring 30, 31. Snap-action projections 36, 37, which each project obliquely with respect to the inner side 11 of the outer bearing ring 3, are integrally formed on the upper side of the collars 34, 35, pointing to the outer bearing ring 3, of both bearing cages 6, 7, which snap-action projections 36, 37, as is apparent in FIGS. 1 and 3, can each be latched into the wedge-shaped annular grooves 27, 28 in the outer bearing ring 3 in order to fix the bearing cages 6, 7 in position in the angular contact rolling bearing 1. Furthermore, FIG. 5 shows that the base 38, 39 of all the cage pockets 32, 33 are additionally embodied in a slight roof-shape in the circumferential direction in the bearing cages 6, 7 in order to permit automatic adaptation of the rolling bodies 8, 8', embodied as ball rollers, to operationally conditioned fluctuations in the contact angle axes 17, 18. The slope on this roof-shaped base 38, 39 is approximately 5° to 10° on both sides here, with the result that the ball rollers can be adapted in their pockets to contact angle fluctuations between 10° and 20° without the ball rollers snapping out of their cage pockets 32, 33 in the process.

LIST OF REFERENCE NUMERALS

1 Angular contact rolling bearing
2 Outer bearing ring
3 Inner bearing ring
4 Row
5 Row
6 Bearing cage of 4
7 Bearing cage of 5
8 Rolling body of 4
8' Rolling body of 5
9 Side face of 8 9'
10 side face of 8
10' Side face of 8'
11 Inner side of 2
12 Outer side of 3
13 Raceway in 2
14 Raceway in 2
15 Raceway in 3
16 Raceway in 3
17 Contact angle axis of 4
18 Contact angle axis of 5
19 Shoulder on 13
20 Shoulder on 14
21 Shoulder on 15
22 Shoulder on 16
23 Free space contour
23' Free space contour
24 Supporting contour
24' Supporting contour
25 Annular groove
26 Annular groove
27 Wedge face of 29
28 Wedge face of 29

29 Central rim
30 Cage ring of 6
31 Cage ring of 7
32 Cage pocket in 6
33 Cage pocket in 7
34 Collars on 6
35 Collars on 7
36 Snap-action projections on 34
37 Snap-action projections on 35
38 Base of 32
39 Base of 33

The invention claimed is:

1. A radial rolling bearing, comprising:
an outer bearing ring;
an inner bearing ring; and
a multiplicity of rolling bodies which are arranged one next to the other in two rows between the inner bearing ring and the outer bearing ring and are held at uniform distances from one another in a circumferential direction by means of two bearing cages, at least one row of which is embodied as ball rollers with two side faces which are flattened symmetrically from a basic ball shape and are arranged parallel to one another,
wherein the two rows of the rolling bodies roll in two adjacent groove-shaped raceways which are formed in an inner side of an outer bearing ring and in an outer side of the inner bearing ring, wherein the contact angle axes of the raceways are positioned obliquely with respect to one another and are bounded, in each case, axially on one side by one shoulder,
wherein additional free space contours and supporting contours are integrally formed at least on the raceways arranged in the outer bearing ring and in the inner bearing ring of one of the rows of rolling bodies and, in each case, in a region of axial edge parts lying opposite the shoulders of the raceways, by means of the free space contours and the supporting contours, the ball rollers can be fitted into angular contact through axial insertion into a distance between the outer bearing ring and the inner bearing ring and subsequent tilting into the raceways, and
wherein, arranged as an additional supporting contour in the inner bearing ring is a central rim, which is wedge-shaped in cross-section, opens with wedge faces into the raceways of the bearing ring and is provided for carrying out pivoting guidance during the tilting of the ball rollers into the operating position in the raceways of the two bearing rings.

2. The radial rolling bearing of claim 1, wherein the radial rolling bearing is a double-row angular contact rolling bearing with contact angle axes which are oriented obliquely with respect to one another toward a point beyond the outer bearing ring, in which radial rolling bearing the two rows of the rolling bodies are embodied as ball rollers and all the raceways in the outer bearing ring and the inner bearing ring have additional free space contours and supporting contours in the region of the edge parts lying opposite the shoulders of the raceways.

3. The radial rolling bearing of claim 2, wherein annular grooves, which each open in the outer bearing ring in the raceways thereof are wedge-shaped in cross-section, are arranged as additional free space contours which are provided in order to bring about the necessary freedom of movement in order to tilt the ball rollers into an operating position in the raceways of the two bearing rings.

4. The radial rolling bearing of claim 3, wherein the bearing cages for the two rows of rolling bodies are each embodied as collar snap-action cages from a plastic, in which bearing cages a plurality of collars which, between them, form cage pockets which are adapted to the contour of the rolling bodies are integrally formed axially on one side of one circumferential cage ring.

5. The radial rolling bearing of claim 4, wherein snap-action projections, which each project obliquely with respect to the inner side of the outer bearing ring, are integrally formed on the upper side of the collars, pointing to the outer bearing ring, of the two bearing cages, which snap-action projections can each be latched into the wedge-shaped annular grooves in the outer bearing ring in order to fix the bearing cages in position in the angular contact rolling bearing.

6. The radial rolling bearing of claim 4, wherein a base of all the cage pockets in the bearing cages are additionally embodied in a slight roof shape in order to automatically adapt the rolling bodies, formed as ball rollers, to operationally conditioned fluctuations in the contact angle axes in the circumferential direction.

* * * * *